Feb. 5, 1952   D. T. PEDEN   2,584,611
ALIGNMENT MANDREL
Filed Sept. 19, 1946
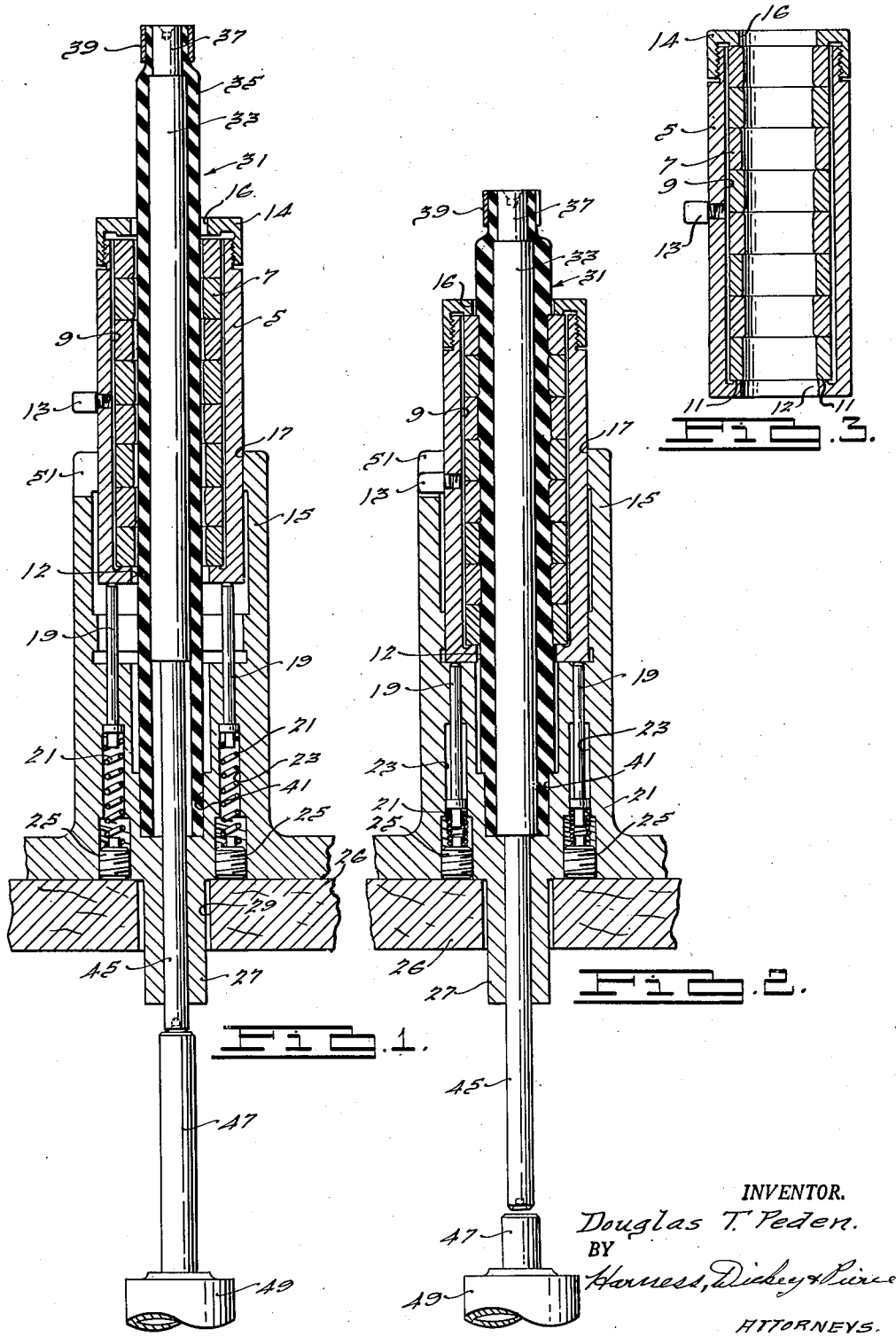
INVENTOR.
Douglas T. Peden.
BY
Harness, Dickey & Pierce
ATTORNEYS.

Patented Feb. 5, 1952

2,584,611

UNITED STATES PATENT OFFICE 2,584,611

ALIGNMENT MANDREL

Douglas T. Peden, Ann Arbor, Mich., assignor to Micromatic Hone Corporation, Detroit, Mich., a corporation of Michigan Application September 19, 1946, Serial No. 698,023

3 Claims. (Cl. 29—235)

This invention relates to means for aligning the bore axes of cylindrical elements and particularly to a mandrel for aligning the bore axes of multiple pieces of work so that they may be clamped to have the bores axially aligned for the performance of machining operations upon said bores.

In a mass production of parts, such as bushings, bearing races, rollers, washers, guide bushings, gears, pinions and the like, it has frequently been found that it is economically impractical to perform machining operations on individual pieces. Through the use of the principles embodied in this invention it has been found not only practical but also economical to aggregate a number of such workpieces in a common workholding fixture and perform the metal cutting, abrading, or other machine operations on the bores of several pieces simultaneously.

Because of the usual inaccuracies in the internal and external dimensions in the blanks or sub-machined parts from which these articles are made, it has frequently been impractical to machine several such parts simultaneously. To do so heretofore often required the removal of excess amounts of material resulting in undue tool cost or abrasive wear in the machining operation. The present invention enables accurate alignment of the bore axes of the several parts, thus enabling the obtainment of a final size of the bore with the lesser amount of material removed, and also subjects the tool to a more nearly uniform working effort throughout the machining operation. This equalizes the material removal throughout the circumference of each workpiece and thus reduces the tool cost and increases the precision of the work produced.

The primary object of this invention is to provide a means for aligning the bore axes of multiple workpieces irrespective of variations in their bore diameters.

It is another object of this invention to enable the obtainment of this alignment without reference to the external dimensions of the several workpieces.

It is a still further object of this invention to provide a means for fixturing several workpieces in a workholding device or shuttle so that the axes of the bores of said workpieces are coincident, thus enabling the performance of a machining operation such as boring, grinding or honing on the surface of said bores without dependence upon the external surfaces of said workpieces for securing or maintaining said alignment.

These and other objects of this invention will become apparent from the following detailed description taken in conjunction with the accompanying drawing in which:

Figure 1 is a cross-sectional view of the workholding carrier with a plurality of workpieces mounted therein, assembled over a mandrel embodying features of this invention;

Fig. 2 is a view of the structure illustrated in Fig. 1 with the mandrel expanded to align the axes of the workpieces in the workholding carrier, and Fig. 3 is a sectional view of the workholding carrier and the workpieces clamped therein with the axes of the bores in aligned relation.

Referring to Figure 1, it will be seen that a shuttle or workholding carrier 5 has a plurality of workpieces 7 therein of possibly varying inside and outside diameters. The carrier 5 has an axial recess 9 passing through the center thereof which is adapted to receive the workpieces 7. The diameter of the recess 9 is larger than the maximum outside diameters of the workpieces to allow for shifting of the workpieces to align the inner bores thereof. The recess 9 is reduced in diameter at the bottom end of the carrier 5 to provide an inwardly directed shoulder 11 for holding the workpieces within the shuttle. The shoulder forms a central aperture 12 of greater diameter than the bore size to be machined to allow a machine tool 7 to pass therethrough and through the bores. A cup-shaped retaining nut 14 is threaded on the top of the carrier for clamping the workpieces firmly in place, the bore 16 of which is the same diameter as the recess 12 to allow the machining tool to pass therethrough. A torque pin 13 is inserted into the side of the carrier 5 for a use which will later be described.

The carrier 5 is supported in a fixture 15 in an axial recess 17 thereof in which it is free to move axially. The bottom of the carrier 5 rests upon two oppositely disposed plunger pins 19 which are carried by springs 21 mounted in apertures 23 in the base of the fixture. The bottom of the springs 21 abut against adjustable screw plugs 25 which are threaded into the bottom of the fixture 15 and may be adjusted to vary the compressive strength of the springs 21. The compressive strength of the springs is adjusted so that they will support the plunger pins and the carrier 5 in position within the fixture 15 as illustrated in Fig. 1, but will not materially resist any downward pressure applied to the carrier for moving it downwardly in the fixture 15 to a position illustrated in Fig. 2. The fixture 15 is rigidly mounted on a worktable 26 or other like suitable supporting means, having an aperture 29 through which a depending cylindrical guide portion 27 extends.

An aligning mandrel generally indicated at 31, is positioned within the center of the fixture 15. The mandrel 31 comprises a central arbor 33 which extends upwardly through the guide portion 27 of the fixture 15 and through the central apertures 12 and 16 in the carrier 5, when the latter is mounted in the fixture. Encompassing the central arbor 33 is an elastic tube 35 made of rubber or like material, the upper end of which is fixed to a reduced neck 37 on the upper end of the arbor 33 by a compression ring 39 fitted over the outside of the tube 35. The lower end of the tube 35 is securely fastened to the inner periphery of an axial recess 41 in the lower portion of the fixture 15 by cementing, vulcanizing or other suitable manner. The arbor 33 has its lower end reduced in diameter to form a rod portion 45 which extends downwardly through the recess 41 in the lower portion of the fixture and through the guide portion 27. A pushrod 47 is connected to a power actuated piston 49 or other operating device which is actuated pneumatically, hydraulically or by a conventional foot treadle, a lever, or the like. The pushrod 47 is adapted to abut the lower end of the rod portion 45 of the arbor 33, and to force it upwardly as will hereinafter be more fully described.

In operation, the pushrod 47 is actuated upwardly to force the rod portion 45 and the arbor 33 upwardly along therewith. This causes the elastic tube 35 to be stretched longitudinally, resulting in a reduction in its diameter. When the tube is sufficiently stretched to reduce the diameter a required amount, the carrier 5 is inserted over the arbor 33 and into the recess 17 in the fixture 15 to be supported on the plunger pins 19 and springs 21. The workpieces 7 are then placed over the aligning mandrel and positioned within the carrier 5 as shown in the drawings with the retaining nut 14 placed loosely upon the carrier so as not to clamp the workpieces tightly in place. It is to be understood that the workpiece may be assembled within the carrier 5 and the nut threaded thereon before being inserted in the fixture and over the mandrel.

The pushrod 47 is then retracted and moved downwardly out of engagement with the arbor 33. When this occurs, the elongated tube will pull the arbor 33 downwardly and in so doing will expand diametrically to more nearly resemble its unstretched diameter. The tube expands while moving downwardly due to its longitudinal contraction and engages the bores and shifts the several workpieces transversely in the carrier until their axes lie on a common center. As the bores are engaged, the workpieces and shuttle are carried downwardly by the longitudinally contracting tube against the pressure exerted on the pins 19 by the springs 21 to assume a position shown in Figure 2. Inasmuch as it is assumed that the bore diameters of all the several workpieces may be dissimilar, radial expansion of the tube will cease at each bore's position, depending upon the diameter of the respective bores. When all of the bore axes have been thus aligned, the retaining nut 14 of the carrier may be tightened and its torsional reaction when so tightening will be opposed by the torque pin 13 which projects into a notch 51 in the wall of the fixture 15. After the nut 14 has been tightened sufficiently to clamp the workpieces against shifting, pressure once more is applied to actuate the push rod 47 and move the arbor 33 upwardly to longitudinally stretch the tube 35 and reduce its diameter. When the diameter is thus reduced, it is then possible to lift the carrier, with the workpieces therein, out of the fixture 15 and away from the mandrel. Once the workpieces have been positioned with the axes of the bores aligned with respect to one another, as illustrated in Fig. 3, any desired machining operation such as boring, grinding, honing, lapping, etc., may be performed thereupon. This results in the production of workpieces having bores of identical size and optimate quality due to a removal of stock, from the periphery of each respective bore, dependent upon their initial respective diameters until like bore diameters are machined on all of the workpieces.

When extreme accuracy in bore location is desired, it is within the purview of this invention to machine the outer wall of the elastic tube 35 on the axis of the arbor 33. This operation may be performed when the tube is longitudinally retracted or when stretched longitudinally a maximum or lesser amount. The operation provides assurance that the wall thickness of the tube is uniform and that its surface is concentric with the arbor axis.

While only one particular embodiment of this invention has been described, it is to be understood that it is not to be restricted thereto and that it is intended to cover all modifications thereof which would be apparent to one skilled in the art and which come within the spirit and scope of the appended claims.

I claim:

1. In a device for centering and aligning the axes of a plurality of bored workpieces in a carrier comprising a fixture having a base at one end and a plurality of concentric bores of different sizes, the smallest bore being in said base to guide an arbor and the largest bore being at the opposite end to slidingly receive a carrier, a plurality of pins mounted in said fixture for sliding movement, spring means normally urging said pins into said largest bore to support a carrier, an arbor slidably mounted for axial movement in said smallest bore and being of a length to extend above and below the fixture, a resilient tube mounted on said arbor and having one end secured to the fixture adjacent the base and the opposite end secured to the arbor at a point outside the largest bore, whereby movement of the arbor axially in one direction compresses and expands the resilient tube to engage the workpieces and move the same and carrier against the action of said spring means to seat the carrier within said largest bore and to axially align the bored workpieces within the carrier, and movement in the opposite direction contracts the resilient tube to release the workpiece.

2. In a device for centering and aligning the axes of a plurality of bored workpieces in a carrier comprising a fixture having a base at one end and a plurality of concentric bores of different sizes, the smallest bore being in said base to guide an arbor and the largest bore being at the opposite end to slidingly receive a carrier, spring means within said largest bore for supporting a carrier and permitting it to be moved downwardly, an arbor slidably mounted for axial movement in said smallest bore and being of a length to extend below the fixture, a resilient tube mounted on said arbor and having one end secured to the fixture adjacent to the base and the opposite end secured to the opposite end of the arbor, whereby movement of the arbor axially in one direction compresses and expands the resilient tube to engage the workpieces and move the same and carrier against the action of said spring means to seat the carrier within said largest bore and to axially align the bored workpieces within the carrier, and movement in the opposite direction contracts the resilient tube to release the workpiece.

3. In a device for centering and aligning the axes of a plurality of bored workpieces in a carrier comprising a fixture having a base at one end and a plurality of concentric bores of different sizes, the smallest bore being in said base to guide an arbor and the largest bore being at the opposite end to slidingly receive a carrier, spring means within said largest bore for supporting a carrier and permitting it to be moved downwardly, an arbor slidably mounted for axial movement in said smallest bore and being of a length to extend below the fixture, a resilient tube mounted on said arbor and having one end secured to the fixture adjacent to the base and the opposite end secured to the opposite end of the arbor, whereby movement of the arbor axially in one direction compresses and expands the resilient tube to engage the workpieces and move the same and carrier against the action of said spring means to seat the carrier within said largest bore and to axially align the bored workpieces within the carrier, and movement in the opposite direction contracts the resilient tube to release the workpiece, and means on said fixture for securing the carrier against rotation after being moved downwardly within the bore having the largest diameter.

DOUGLAS T. PEDEN.

REFERENCES CITED

The following references are of record in the file of this patent:

UNITED STATES PATENTS

| Number | Name | Date |
| --- | --- | --- |
| 1,454,350 | Teetor | May 8, 1923 |
| 1,654,736 | Kistner | Jan. 3, 1928 |
| 1,708,141 | Kepler | Apr. 9, 1929 |
| 1,808,288 | Chapman et al. | June 2, 1931 |
| 2,021,259 | Magnuson | Nov. 19, 1935 |
| 2,120,113 | Novey et al. | June 7, 1938 |
| 2,176,816 | Huhn | Oct. 17, 1939 |
| 2,252,299 | McCoy | Aug. 12, 1941 |
| 2,446,661 | Mundock | Aug. 10, 1948 |
| 2,450,727 | Haushalter | Oct. 5, 1948 |